Jan. 9, 1962

W. G. BARRETT 3,016,469

MULTISTABLE CIRCUIT

Filed Dec. 15, 1958

INVENTOR
WILLIAM G. BARRETT
BY
ATTORNEY

United States Patent Office 3,016,469

Patented Jan. 9, 1962

3,016,469
MULTISTABLE CIRCUIT

William G. Barrett, Bountiful, Utah, assignor to Sperry Rand Corporation, Great Neck, N.Y., a corporation of Delaware Filed Dec. 15, 1958, Ser. No. 780,565
20 Claims. (Cl. 307—88.5)

This invention relates to multistable circuits and more particularly to circuits for controlling the states of a two-element flip-flop and for producing an output signal responsive to an input signal that changes a flop-flop from a particular one to the other of its stable states.

The general nature of a two-element bistable flip-flop is well known. The two-element flip-flop is characterized by twin sections, each of which is operable in "opposite" states generally referred to as "on" and "off," which, depending on the component and design, may cover such situations as conductive and less conductive, saturation and cut-off, two different output voltage level, etc. The inputs and outputs of the two sections are interconnected to form a feedback loop circuit for concurrently maintaining the two sections in opposite states, i.e., one section on and the other off, in the absence of external signals. Obviously, there are two possible "on and off" combinations between the two sections. When a particular one of the sections is on and the other is off, the flip-flop is in one of its two stable states, and when these relations between the sections are reversed, the flip-flop is in the other of its stable states. Direction of reversal or change refers to an indication of which state a section or a flip-flop is changing from and to. For example, a reversal of a section from off to on is one direction of reversal, and a reversal from on to off is the other direction of reversal of the sections. Usually, the flip-flop has two input terminals corresponding to its two stable states, whereby an appropriate signal supplied to either one of the terminals will switch the flip-flop to the stable state associated with that terminal.

Because of their inherent storage capabilities, flip-flops are often employed as binary storage devices such as counter and shift register stages, and in such applications it is usually required to generate an output pulse in response to the reversal from a particular one of the stable states to the other in order to supply a succeeding stage or other binary consumption circuit. For example, if one of the stable states represents binary 1 and the other 0, an output pulse for transmission to a following stage may be required every time the flip-flop switches from the 1 state to the 0 state in a forward counter or shift register, or from 0 to 1 in a backward counter or shift register. Output pulses from a flip-flop stage should be uniform and the input pulses to a flip-flop stage should be adequate as regards shape, amplitude, width and timing in order to assure lock-in of the flip-flop after the reversal of states.

When employed as a counter stage, a common practice is to apply successive input pulses to alternate sides of the flip-flop through steering gates connected to a common input terminal. In this type of counter, the successive pulses are applied to the common input of the gating network which, in response to the then state of the flip-flop, steers each pulse to that side which will reverse the state of the flip-flop. In the interest of simplicity and economy, it would be desirable to eliminate the steering gates.

One phase of the present invention is directed to the combination of a flip-flop and a pulse generating circuit which, in response to the application of an input pulse to that side of the flip-flop representative of one stable state, when the flip-flop is in the opposite state, produces a uniform output pulse that is fed back to the input in the same sense as the input pulse to continue the excitation initiated by the input pulse for the duration of the generated pulse, thus maintaining the new state until all possible unsettling transients have disappeared and the new state can be maintained by the normal feedback between the two sections of the flip-flop.

Another aspect of the invention contemplates a flip-flop counter employing the above pulse generating circuit and having a split input for applying all the successive input pulses to both sections of the flip-flop in a time staggered manner. This counter does not require steering gates customarily employed in flip-flop counters.

In accordance with one embodiment of the invention, a binary storage circuit comprises a flip-flop and a regenerative circuit that includes one of the flip-flop sections and a one-shot or monostable pulse forming circuit which is coupled to that section and which, in response to a particular reversal of state of that section caused by the receipt of an input pulse by that section, feeds back to that section a pulse sensed as the input pulse (positive feedback), but whose width because of the regeneration is independent of the input pulse, and is limited only by a time constant of the one-shot. The output of the one-shot is also transmitted to a succeeding stage as a transfer signal. This arrangement makes it possible to employ the flip-flop as a binary counter or divider without the need of steering gates customarily required in flip-flop counters. In the counter the positive feedback is delayed beyond the termination of a signal pulse applied to the other section to override the effect of the latter signal. Sharing of a common section by the flip-flop and the regenerative circuit effects an economy of parts.

It is therefore an object of the present innvention to provide a novel multistable circuit.

Another object of the invention is a multistable storage circuit with novel means for prolonging the effect of an input signal.

Another object is a multistable storage circuit having novel means for feeding back to the input a delayed pulse sensed as an input pulse.

Another object is to standardize the output pulses of a multistable storage circuit.

Another object is to provide a flip-flop storage circuit with pulse regenerating means that shares one of the flip-flop sections with the flip-flop itself.

Another object of the invention is the combination of a two-element flip-flop and a regenerative circuit both of which include as a common component one of the sections of the flip-flop.

Still another object of the present invention is to generate an output pulse responsive to the reversal of a flip-flop section caused by an input signal applied to that section of the flip-flop, the output pulse having a width independent of the width of the input pulse.

A further object of the invention is a flip-flop counter arrangement that does not require steering gates as such.

A further object is the attainment of any or all of the aforesaid objects by means of transistorized circuits.

Further objects and advantages of the invention will be apparent from the following description, references being had to the accompanying drawing wherein a preferred form of the present invention is clearly shown.

Figure 1:
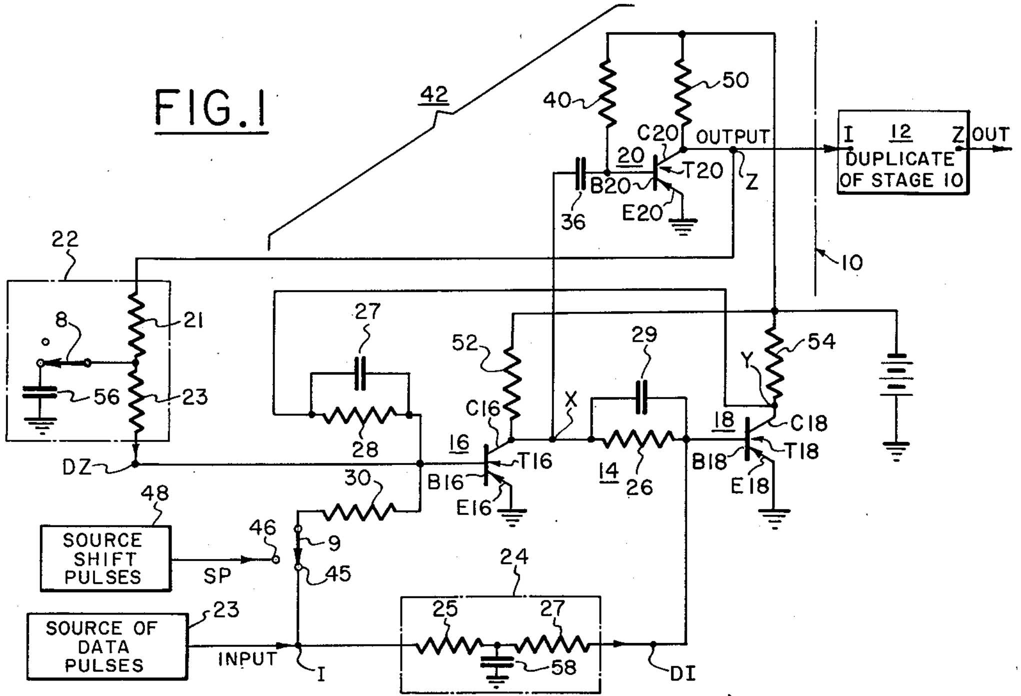
FIG. 1 is a diagrammatic showing of a preferred form of the invention as embodied in a binary storage circuit which may be employed as a counter or a shift register, depending on switch positions.

In FIG. 1, with switches 8 and 9 in the positions illustrated, cascaded stages 10 and 12 operate as binary counters, and being similar, only stage 10 will be described in detail. Each stage is a scale-of-two counter, and for convenience is often referred to herein as a "counter." A flip-flop 14 in counter 10 includes twin sections 16 and 18 with their respective inputs and outputs cross-coupled in an in-phase feedback loop. The output X of section 16 is fed to a pulse-forming circuit 20 that responds only toa particular change in state of section 16. The output Z of the pulse-forming circuit 20 constitutes the output of the counter stage 10 and is also fed back to the input of section 16 through a delay 22. Flip-flop section 16 and the pulse-forming circuit 20 constitute a regenerative circuit for producing uniform output pulses and for maintaining the effect of the input pulse which initiates the particular change in state of section 16. All input pulses received from a source 23 at input terminal I are routed to the input of section 16 and through a delay 24 to the input of section 18, thus applying each operating pulse to the inputs of both sections in time staggered relation. Delays 22 and 24 may be of any suitable type for example the RC delays illustrated. Source 23 may be any suitable source of pulses, such as a computer clock, a preceding counter stage, manual or programmed input, tapes, drums, etc.

By way of example, the flip-flop sections 16 and 18 are shown as resistance coupled, multiple input, grounded emitter transistor stages, the resistance coupling providing buffering or isolation between the multiple input lines to each section. The pulse-forming circuit 20 also includes a transistor.

Each transistor is referenced by the letter T and the number of its associated circuit section. The base, emitter and collector electrodes of each transistor are indicated by the respective letters B, E and C, each coupled to the number of its associated transistor. For example, the transistor in the pulse-forming circuit 20 is labeled T20 and its base, emitter and collector are referenced as B20, E20 and C20, respectively.

As seen in the drawing, the emitter arrows of the respective transistors are directed into the transistor bases signifying, according to the well-known convention, that the transistors are p-n-p, and, accordingly, each may be turned to full on or saturation by an appropriate negative input signal applied to its base, and may be effectively cut off by the application of a less negative or positive signal to the base. It will be appreciated that "cut-off" ideally means "no conduction," but as a practical matter the term covers relatively low conduction. At cut-off, the collector voltage is substantially that of the supply source, negative in the case of a p-n-p transistor and positive in the case of n-p-n, while at full conduction (transistor turned on) the collector voltage is driven toward zero, less ngeative in a p-n-p and less positive in a n-p-n transistor. Thus, it can be seen that as a binary logic element, the transistor in the grounded emitter configuration is an inverter, that is, the output, as represented by the collector voltage level, is the NOT of the input signal.

In the example shown, the values of voltage and resistance with respect to transistors T16 and T18 are such that the proper negative voltage arbitrarily representing one of the binary digits applied to any input line to a transistor will cause the transistor to conduct and drive the collector from negative to a less negative voltage representing the other binary digit at the transistor output. The voltage and resistance arrangements are such that all the input lines to a transistor must be at the less negative voltage representing said other binary digit to cut off the transistor in order to drive the collector voltage (output) to the negative value representing said one binary digit. The action is equivalent to the inverse or the NOT of an OR (NOT-OR) function (Boolean logic). Thus, if the respective inputs would be $a$, $b$ and $c$, the output would be $(a+b+c)'=a'b'c'$, where OR is represented by "+," and AND by absence of sign between quantities. $(a+b+c)'$ is the NOT-OR, while the equivalent $a'b'c'$ is the AND of the NOTS.

The particular examples shown being p-n-p transistors, it is convenient to represent binary 1 by a negative pulse, and binary 0 by a less negative signal such as ground or a positive signal. Thus, a negative pulse (binary 1) applied through any one or more of the three input resistors of the transistor in section 16, will turn the transistor on and will drive its output voltage (collector voltage) to a less negative value representing binary 0. Resistors 21 and 23 which are part of the delay 22 also constitute the coupling resistance in an input line to the transistor T16. Likewise, resistors 25 and 27 which are part of the delay 24, also constitute the coupling resistance in an input line to the transistor T18. To avoid cumbersome language, the aforesaid "less negative" values may be referred to as "ground" although they might not be precisely that. In order to provide a binary 1 at output X, there must be a binary 0 on each of the three input resistors of section 16. Thus, section 16 and likewise section 18 perform the NOT-OR logical function on their respective multiple input lines.

The output terminal X of section 16 is connected to the input of section 18 through a resistor 26, while the output Y of section 18 is connected to the input of section 16 through a resistor 28. Thus, the sections 16 and 18 are cross-coupled to each other to form a two-element flip-flop arrangement. Condensers 27 and 29 across the resistors 26 and 28 speed up the flip-flop.

Input terminal I is connected to the input of section 16 through a resistor 30 and to the input of section 18 through the delay 24, whereby information pulses received at terminal I are applied to the inputs of the respective sections in time staggered relation.

The pulse-forming circuit 20 may, for example, be a one-shot as shown, which includes the transistor T20 in grounded emitter configuration with its base B20 connected through a capacitor 36 to the output X of section 16 and its collector C20 (point Z) connected through the delay 22 to the input of section 16 of the flip-flop. A fixed-bias resistor 40 normally biases transistor T20 to saturation or "on" placing the output Z at or near ground potential. The interconnections between section 16 and the pulse-forming circuit 20 form a pulse regenerating circuit 42 which includes section 16 and the pulse-forming circuit 20. Thus, section 16 is shared by two distinct circuits, the flip-flop circuit 14 and the pulse regenerating circuit 42. In its operation, as later described, it will be seen that the pulse regenerating circuit 42 responds to an input pulse applied through resistor 30 to section 16 if a binary 1 is stored in the flip-flop and, as a result of that response, applies to section 16 through the delay 22, a regenerated pulse sensed as the original input pulse received through resistor 30, thus maintaining the effect of that input pulse until the flip-flop resettles in the 0 state as later described.

Flip-flop 14 is in the 0 state when sections 16 and 18 are respectively on and off, that is, points X and Y are respectively ground and negative. Thus, section 16 supplies a ground input signal through resistor 26 to section 18, and section 18 supplies a negative input signal through resistor 28 to section 16. In the absence of signals representing binary 1's at the input I, there will be a ground signal applied to each of the input lines to section 18.

Figure 2:
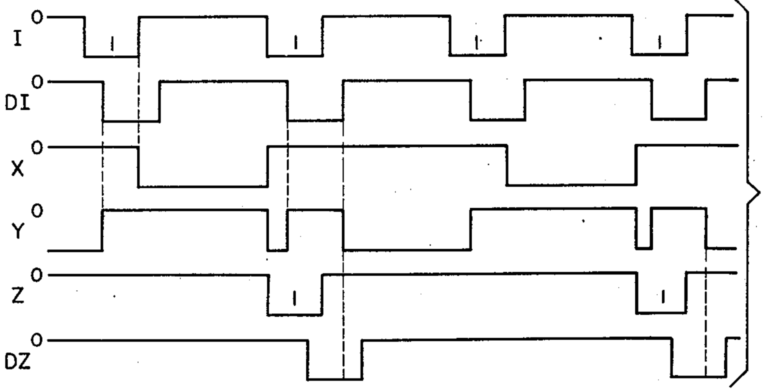
FIG. 2 is a chart showing time based waveforms at different circuit points of the circuit of FIG. 1 when employed as a counter, each waveform being labelled with the letter corresponding to the circuit point represented as referenced in FIG. 1.

It is convenient to refer to the self-explanatory waveforms of FIG. 2 in following the operation of the apparatus. Assuming that the flip-flop 14 is originally in the 0 state, a binary 1 or negative pulse received at the input terminal I will be applied first to section 16 and later through the delay 22 to section 18. Section 16 being already conductive, the negative input pulse will have no effect on it until the negative pulse applied to this section terminates. On the other hand, the delayed negative pulse applied through delay 24 will turn transistor T18 on, its output Y then applying ground to resistor 28. Because of delay 24, after the negative input pulse applied to resistor 30 terminates, all the input lines to section 16 will be at ground potential, thus cutting off transistor T16 and settling the flip-flop 14 in the 1 state. When section 16 is cut off, a negative pulse is transmitted from its output X through capacitor 36 to transistor T20 which is unaffected because it is already in the conductive state.

Upon receipt of the next binary 1 or negative input pulse at the input I, it is applied through resistor 30 to turn on transistor T16 sending a positive pulse from its output X to the one-shot 20, thereby turning transistor T20 off and sending a negative pulse from its output Z through delay 22 to the input of transistor T16. The length of the negative output pulse at Z is determined by the charging time constant of capacitor 36 and resistances in series with it and the charging source V. In the meantime, the negative input pulse at terminal I was applied through delay 24 to transistor T18 maintaining that transistor on for the duration of the input pulse which terminates at that transistor before the termination of the pulse supplied by the one-shot 20 to the input of transistor T16. Upon the termination of the input pulse to transistor 18, that transistor is turned off. Thus, the delayed regenerated pulse fed back from the one-shot to the transistor T16 overrides the effect of the input pulse from terminal I to transistor T18 and thereby makes sure that the flip-flop 14 is locked in the 0 state. In the meantime the previously stored binary 1 has been transferred to the next stage 12 via the negative pulse from the output Z of the one-shot. All the output pulses at Z have a constant width and amplitude independent of the width and amplitude of the pulses applied to the input I.

The counter 10 will remain in the 0 state until the next pulse which will reverse the flip-flop to the 1 state as hereinbefore described. In the case of a counter, every other pulse sets the counter to 1, and all in between pulses reset the counter to 0. Every time the counter reverses from the 1 to the 0 state, the regenerated pulse from the one-shot is transmitted to the next stage 12.

When driving pulses occur simultaneously at the inputs of both sections of a flip-flop, the time required for the flip-flop to settle or to assure lock-in of the state dictated by the remaining pulse after the other has terminated, may be conveniently referred to as "settling time" or T. It will be noted from the waveforms in FIG. 2 that the delays 22 and 24 are such that the delayed input pulse at DI and also the regenerated pulse at DZ "straddle" or overlap the lagging edge of the input pulse at I. The lagging edge of the delayed input pulse at DI must lag the lagging edge of the input pulse at I by at least time T, and the lagging edge of the pulse at DZ must lag the lagging edge of the pulse at DI by at least time T. To avoid false outputs at X, the leading edge of the pulse at DZ must lead at least one of the following, the lagging edge of the pulse at I or the leading edge of the pulse at DI.

The above relations may be obtained by relating the delay elements as follows:

$$D24 > T$$
$$D22 > D24 + T$$

While in no way restricted thereto, the following are examples of related values and components found useful in practicing the invention.

| | |
|---|---|
| Transistors **T16**, **T18** and **T20** | Philco type 2N240. |
| Resistors **21** and **25** | 3900 ohms each. |
| Resistors **23** and **27** | 3600 ohms each. |
| Resistors **26**, **28** and **30** | 7500 ohms each. |
| Resistor **40** | 33,000 ohms each. |
| Resistors **50**, **52** and **54** | 6200 ohms each. |
| Capacitor **36** | 240 mmfds. |
| Capacitor **56** | 510 mmfds. |
| Capacitor **58** | 75 mmfds. |
| Capacitors **27** and **29** | 24 mmfds. each. |
| Voltage V | 10 volts. |
| Operating pulses | 3 v. |

The above values and components permitted additional loading of the transistor outputs with other circuits unrelated to the invention, for example indicators of flip-flop states, etc.

The combination of a regenerative circuit and a flip-flop sharing a common element may be used in other binary storage configurations. For example by opening switch 8, and operating switch 9 to open the circuit at 45 and close the circuit at 46, the stage 10 may be used as a shift register, the information pulses being applied to the input of section 18 through input terminal I and delay 24, and the shift pulses from source 48 to the input of section 16 through resistor 30.

Figure 3:
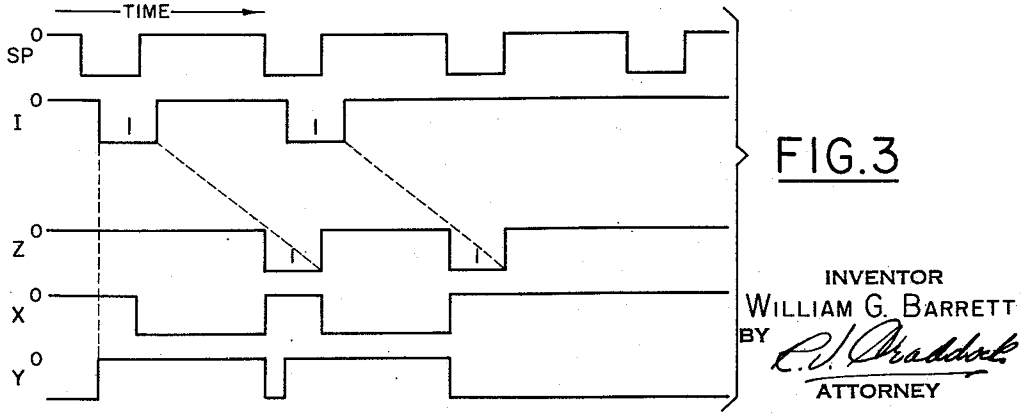
FIG. 3 is a chart of waveforms of the circuit of FIG. 1 when employed as a shift register.

In the shift register, information digits and shift pulses are synchronous between stages. The delay 24 will time stagger the operating pulses, i.e., the shift and information pulses, as shown in the chart of FIG. 3 which shows the waveforms at the various circuit points when the apparatus of FIG. 1 is operated as a shift register. The general operation of the circuit as a shift register is adequately evident from the chart of FIG. 3 which at I and Z shows two pulses or 1's stored and shifted out of the register stage.

A binary 1 is stored in the flip-flop by each negative pulse at terminal I, the storage occurring upon the expiration of the immediately preceding shift pulse at SP. This action is the same as that heretofore described in connection with the odd-numbered pulses applied to terminal I when the apparatus is used as a counter. Each shift pulse resets the flip-flop and if a 1 had been previously stored, the resetting of the flip-flop shifts out the 1 in the same manner as a 1 is shifted out of the counter. However, it can be seen from the waveforms of FIG. 3 that the delay 22 is not necessary when the apparatus is used as a shift register because the ultimate state of a storage stage is a function only of the state of the preceding stage and not of the stage itself. A main advantage of this shift register is that the regenerating circuit 42 provides an output pulse at Z which is uniform and independent of the shift pulse widths regardless of the configuration of the information passing through the stage.

While the form of embodiment of the invention as herein disclosed constitutes a preferred form, it is to be understood that other forms might be adopted, all coming within the scope of the claims which follow.

What is claimed is:

1. Digital storage apparatus comprising a multistable circuit including a plurality of sections interconnected to form a first closed loop circuit, each of said sections having an input and an output and each being operable in opposite states in response to signals applied to its input, and a second closed loop circuit operable in response to each reversal from a particular one to the other of the states of one of said sections for producing and applying to the input of said one section a pulse sensed as the input pulse that caused said reversal, said second loop circuit including a pulse-forming circuit and said one section, the pulse-forming circuit having an input and an output, the output of said one section being coupled to the input of the pulse-forming circuit and the output of the latter being coupled to the input of said one section.

2. Pulse responsive apparatus comprising a bistable flip-flop including first and second sections each having an input and an output and each being capable of assuming either one of two different states A and B in response to B and A signal respectively, the A state providing an A type output signal and in the B state providing a B type output signal, the sections being cross-coupled in a first closed loop circuit to maintain each other concurrently in different states when the uninfluenced by external signals, means for supplying an A type input signal first to the input of one of said sections, means for later supplying the latter signal to the input of the other of said sections, and a regenerative circuit comprising a second closed loop circuit including said one section and a pulse forming circuit coupled between the output and the input of said one section, said pulse forming circuit being operable to produce an A type pulse when said one section shifts from the A to the B state in response to said A type input signal first supplied to said one section, the regenerative circuit having sufficient delay to apply an A type output pulse from the pulse forming circuit to the input of the first section long enough to settle the first section in the B state after the expiration of said later applied A signal at the input of the second section.

3. Digital storage apparatus comprising a bistable two-element flip-flop including two sections cross-coupled to each other forming a first closed loop circuit, each of said sections having an input and an output and each being operable in opposite states in response to signals applied to its input, means for supplying driving pulses to the inputs of the respective sections, means for causing a delayed effect on one section by the other section acting in response to said driving pulses, said delay being with respect to the time that said driving pulses are applied to the input of said one section, and a pulse regenerating circuit operable in response to each reversal from a particular one to the other of the states of said one section for producing and applying to the input of said one section a pulse sensed as the input pulse that caused said reversal and having a lagging edge later in time than the expiration of said delayed effect, said regenerating circuit comprising a second closed loop circuit including a pulse-forming circuit and said one section, the pulse-forming circuit having an input and an output, the output of said one section being coupled to the input of the pulse-forming circuit and the output of the latter being coupled to the input of said one section.

4. Digital storage apparatus comprising a bistable two-element flip-flop including two sections cross-coupled to each other forming a first closed loop circuit, each of said sections having an input and an output and each being operable in opposite states in response to signals applied to its input, means for supplying driving pulses to the inputs of the respective sections in time staggered relation, said means comprising common input means for receiving information pulses and means for first applying each information pulse to the input of one section and later to the input of the other section, and a pulse regenerating circuit operable in response to each reversal from a particular one to the other of the states of said one section for producing and applying to the input of said one section a pulse sensed as the information input pulse that caused said reversal and having a lagging edge later in time than the expiration of said information input pulse after its arrival at the input of said other section, said regenerating circuit comprising a second closed loop circuit including a pulse-forming circuit and said one section, the pulse-forming circuit having an input and an output, the output of said one section being coupled to the input of the pulse-forming circuit and the output of the latter being coupled to the input of said one section.

5. Digital storage apparatus comprising a bistable two-element flip-flop having two sections each having a plurality of input lines and an output and each being operable in opposite states in response to bivalued signals applied to its inputs, the output of each section being coupled to a first input line of the other forming a first closed loop, a regenerative circuit for providing a uniform duration of excitation initiated only by an input signal applied to a second input line of one of said sections which causes that section to change from a particular one to the other of its states of operation, said regenerative circuit comprising a second closed loop including a pulse-forming circuit and said one section, the pulse-forming circuit having an input and an output, the output of said one section being coupled to the input of said pulse-forming circuit and the output of the latter being coupled to a third input line of said one only of said sections, and means for applying operating pulses to said second input line of said one section and to a second input line of said other section in time-staggered relation.

6. Digital storage apparatus comprising a multistable circuit including a plurality of sections interconnected to form a first closed loop circuit, each of said sections having an input and an output and each being operable in opposite states in response to signals applied to its input, and a second closed loop circuit operable in response to each reversal from a particular one to the other of the states of one of said sections for producing and applying to the input of said one section a pulse sensed as the input pulse that caused said reversal, said second loop circuit including a pulse-forming circuit and said one section, the pulse-forming circuit having an input and an output, the output of said one section being coupled to the input of the pulse-forming circuit and the output of the latter being coupled to the input of said one only of said sections.

7. Digital storage apparatus comprising a multistable circuit including a plurality of sections interconnected to form a first closed loop circuit, each of said sections having an input and an output and each being operable in opposite states in response to signals applied to its input, and a second closed loop circuit operable in response to each reversal from a particular one to the other of the states of one of said sections for producing and applying to the input of said one section a pulse sensed as the input pulse that caused said reversal, said second loop circuit including a monostable pulse-forming circuit and said one section, the pulse-forming circuit having an input and an output, the output of said one section being coupled to the input of the pulse-forming circuit and the output of the latter being coupled to the input of said one section.

8. Digital storage apparatus comprising a bistable flip-flop including two sections cross-coupled to each other to form a first closed loop circuit, each of said sections having an input and an output and each being operable in opposite states in response to signals applied to its input, and a second closed loop circuit operable in response to each reversal from a particular one to the other of the states of one of said sections for producing and applying to the input of said one section a pulse sensed as the input pulse that caused said reversal, said second loop circuit including a pulse-forming circuit and said one section, the pulse-forming circuit having an input and an output, the output of said one section being coupled to the input of the pulse-forming circuit and the output of the latter being coupled to the input of said one section.

9. Digital storage apparatus comprising a bistable flip-flop including two sections cross-coupled to each other to form a first closed loop circuit, each of said sections having an input and an output and each being operable in opposite states in response to signals applied to its input, and a second closed loop circuit operable in response to each reversal from a particular one to the other of the states of one of said sections for producing and applying to the input of said one section a pulse sensed as the input pulse that caused said reversal, said second loop circuit including a pulse-forming circuit and said one section, the pulse-forming circuit having an input and an output, the output of said one section being coupled to the input of the pulse-forming circuit and the output of the latter being coupled to the input of said one only of said sections.

10. Digital storage apparatus comprising a bistable flip-flop including two sections cross-coupled to each other to form a first closed loop circuit, each of said sections having an input and an output and each being operable in opposite states in response to signals applied to its input, and a second closed loop circuit operable in response to each reversal from a particular one to the other of the states of one of said sections for producing and applying to the input of said one section a pulse sensed as the input pulse that caused said reversal, said second loop circuit including a monostable pulse-forming circuit and said one section, the pulse-forming circuit having an input and an output, the output of said one section being coupled to the input of the pulse-forming circuit and the output of the latter being coupled to the input of said one section.

11. Digital storage apparatus comprising a multistable circuit including a plurality of sections interconnected to form a first closed loop circuit, each of said sections having an input and an output and each being operable in opposite states in response to signals applied to its input, an external signal source connected to supply operating pulses to one of said sections, and a second closed loop circuit operable in response to each reversal from a particular one to the other of said states of said one section caused by the application of an external operating pulse from said source to the input of that section for producing and applying to the input of said one section a pulse sensed as said external operating pulse at the input of said one section, said second loop circuit including a pulse-forming circuit and said one section, the pulse-forming circuit having an input and an output, the output of said one section being coupled to the input of the pulse-forming circuit and the output of the latter being coupled to the input of said one section.

12. Digital storage apparatus comprising a multistable circuit including a plurality of sections interconnected to form a first closed loop circuit, each of said sections having an input and an output and each being operable in opposite states in response to signals applied to its input, means for supplying an operating pulse to the inputs of the respective sections in time staggered relation, said means comprising common input means for receiving operating pulses and means coupled to said common input means for applying each of said operating pulses first to one of said sections and later to a second of said sections, and a second closed loop circuit operable in response to each reversal from a particular one to the other of said states of said one section caused by the application of an operating pulse from said common input means to the input of that section for producing and applying to the input of said one section a pulse sensed as said operating pulse at the input of said one section, said second loop circuit including a pulse-forming circuit and said one section, the pulse-forming circuit having an input and an output, the output of said one section being coupled to the input of the pulse-forming circuit and the output of the latter being coupled to the input of said one section.

13. Digital storage apparatus comprising a bistable flip-flop including two sections cross-coupled to each other to form a first closed loop circuit, each of said sections having an input and an output and each being operable in opposite states in response to signals applied to its input, an external signal source connected to supply operating pulses to one of said sections, and a second closed loop circuit operable in response to each reversal from a particular one to the other of said states of said one section caused by the application of an external operating pulse from said source to the input of that section for producing and applying to the input of said one section a pulse sensed as said external operating signal at the input of said one section, said second loop circuit including a pulse-forming circuit and said one section, the pulse-forming circuit having an input and an output, the output of said one section being coupled to the input of the pulse-forming circuit and the output of the latter being coupled to the input of said one section.

14. Digital storage apparatus comprising a bistable flip-flop including two sections cross-coupled to each other to form a first closed loop circuit, each of said sections having an input and an output and each being operable in opposite states in response to signals applied to its input, an external signal source connected to supply operating pulses to one of said sections, and a second closed loop circuit operable in response to each reversal from a particular one to the other of said states of said one section caused by the application of an external operating pulse from said source to the input of that section for producing and applying to the input of said one section a pulse sensed as said external operating signal at the input of said one section, said second loop circuit including a monostable pulse-forming circuit and said one section, the pulse-forming circuit having an input and an output, the output of said one section being coupled to the input of the pulse-forming circuit and the output of the latter being coupled to the input of said one section.

15. Digital storage apparatus comprising a bistable flip-flop including two sections cross-coupled to each other to form a first closed loop circuit, each of said sections having an input and an output and each being operable in opposite states in response to signals applied to its input, means for supplying an operating pulse to the inputs of the respective sections in time-staggered relation, said means comprising common input means for receiving operating pulses and means coupled to said common input means for applying each of said operating pulses first to one of said sections and later to the other section, and a second closed loop circuit operable in response to each reversal from a particular one to the other of said states of said one section caused by the application of an operating pulse from said common input means to the input of that section for producing and applying to the input of said one section a pulse sensed as said operating pulse at the input of said one section, said second loop circuit including a pulse-forming circuit and said one section, the pulse-forming circuit having an input and an output, the output of said one section being coupled to the input of the pulse-forming circuit and the output of the latter being coupled to the input of said one section.

16. Digital storage apparatus comprising a bistable flip-flop including two sections cross-coupled to each other to form a first closed loop circuit, each of said sections having an input and an output and each being operable in opposite states in response to signals applied to its input, means for supplying an operating pulse to the inputs of the respective sections in time-staggered relation, said means comprising common input means for receiving operating pulses and means coupled to said common input means for applying each of said operating pulses first to one of said sections and later to the other section, and a second closed loop circuit operable in response to each reversal from a particular one to the other of said states of said one section caused by the application of an operating pulse from said common input means to the input of that section for producing and applying to the input of said one section a pulse sensed as said operating pulse at the input of said one section, said second loop circuit including a monostable pulse-forming circuit and said one section, the pulse-forming circuit having an input and an output, the output of said one section being coupled to the input of the pulse-forming circuit and the output of the latter being coupled to the input of said one section.

17. Digital storage apparatus comprising a bistable flip-flop including two sections cross-coupled to each other to form a first closed loop circuit, each of said sections having an input and an output and each being operable in opposite states in response to signals applied to its input, an external source of operating pulses, means coupled to said source for applying each external operating pulse first to said one section and later to the other section, and a second closed loop circuit operable in response to each reversal from a particular one to the other of said states of said one section caused by the application of an external operating pulse from said source to the input of that section for producing and applying to the input of said one section a pulse sensed as the external operating pulse at the input of said one section that caused said reversal, said second loop circuit including a pulse-forming circuit and said one section, the pulse-forming circuit having an input and an output, the output of said one section being coupled to the input of the pulse-forming circuit and the output of the latter being coupled to the input of said one section.

18. Digital storage apparatus comprising a bistable two-element flip-flop having two sections each having a plurality of input lines buffered from each other and an output and each being operable in opposite states in response to signals applied to its inputs, the output of each section being coupled to a first input line of the other forming a first closed loop, first delay means, second delay means having more delay than the first delay means, means for applying operating pulses to a second input line of one of said sections and to a second input line of the other section in time-staggered relation, the latter means comprising an input circuit for receiving an operating pulse and for applying it first to said second input line of said one section and through said first delay means later to said second input line of the other section, and a second closed loop circuit operable in response to each reversal from a particular one to the other of said states of said one section caused by the application of an operating pulse to the second input line of that section for producing and applying through said second delay means to a third input line of said one section, a pulse sensed as said operating pulse at the second input line of said one section, said second loop circuit including a pulse-forming circuit and said one section, the pulse-forming circuit having an input and an output, the output of said one section being coupled to the input of the pulse-forming circuit and the output of the latter being coupled through said second delay means to the input of said one section.

19. Digital storage apparatus comprising a bistable flip-flop including two sections cross-coupled to each other to form a first closed loop circuit, each of said sections having an input and an output and each being operable in opposite states in response to signals applied to its input, first delay means, second delay means having more delay than the first delay means, means for supplying an operating pulse to the inputs of the respective sections in time-staggered relation, said means comprising common input means for receiving operating pulses and means coupled to said common input means for applying each of said operating pulses first to one of said sections and later through said first delay means to the other section, and a second closed loop circuit operable in response to each reversal from a particular one to the other of said states of said one section caused by the application of an operating pulse from said common input means to the input of that section for producing and applying through said second delay means to the input of said one section a pulse sensed as said operating pulse at the input of said one section, said second loop circuit including a pulse-forming circuit and said one section, the pulse-forming circuit having an input and an output, the output of said one section being coupled to the input of the pulse-forming circuit and the output of the latter being coupled through said second delay means to the input of said one section.

20. Digital storage apparatus comprising a bistable flip-flop including two sections cross-coupled to each other to form a first closed loop circuit, each of said sections having an input and an output and each being operable in opposite states in response to signals applied to its input, first delay means, second delay means having more delay than the first delay means, means for supplying an operating pulse to the inputs of the respective sections in time-staggered relation, said means comprising common input means for receiving operating pulses and means coupled to said common input means for applying each of said operating pulses first to one of said sections and later through said first delay means to the other section, and a second closed loop circuit operable in response to each reversal from a particular one to the other of said states of said one section caused by the application of an operating pulse from said common input means to the input of that section for producing and applying through said second delay means to the input of said one section a pulse sensed as said operating pulse at the input of said one section, said second loop circuit including a monostable pulse-forming circuit and said one section, the pulse-forming circuit having an input and an output, the output of said one section being coupled to the input of the pulse-forming circuit and the output of the latter being coupled through said second delay means to the input of said one section.

References Cited in the file of this patent

UNITED STATES PATENTS

| | | |
|---|---|---|
| 2,683,806 | Moody | July 13, 1954 |
| 2,827,574 | Schneider | Mar. 18, 1958 |
| 2,854,590 | Wolfe | Sept. 30, 1958 |
| 2,860,258 | Hall | Nov. 11, 1958 |
| 2,881,333 | Pickard | Apr. 7, 1959 |
| 2,885,663 | Curtis | May 5, 1959 |
| 2,949,547 | Zimmermann | Aug. 16, 1960 |